Patented Nov. 11, 1930

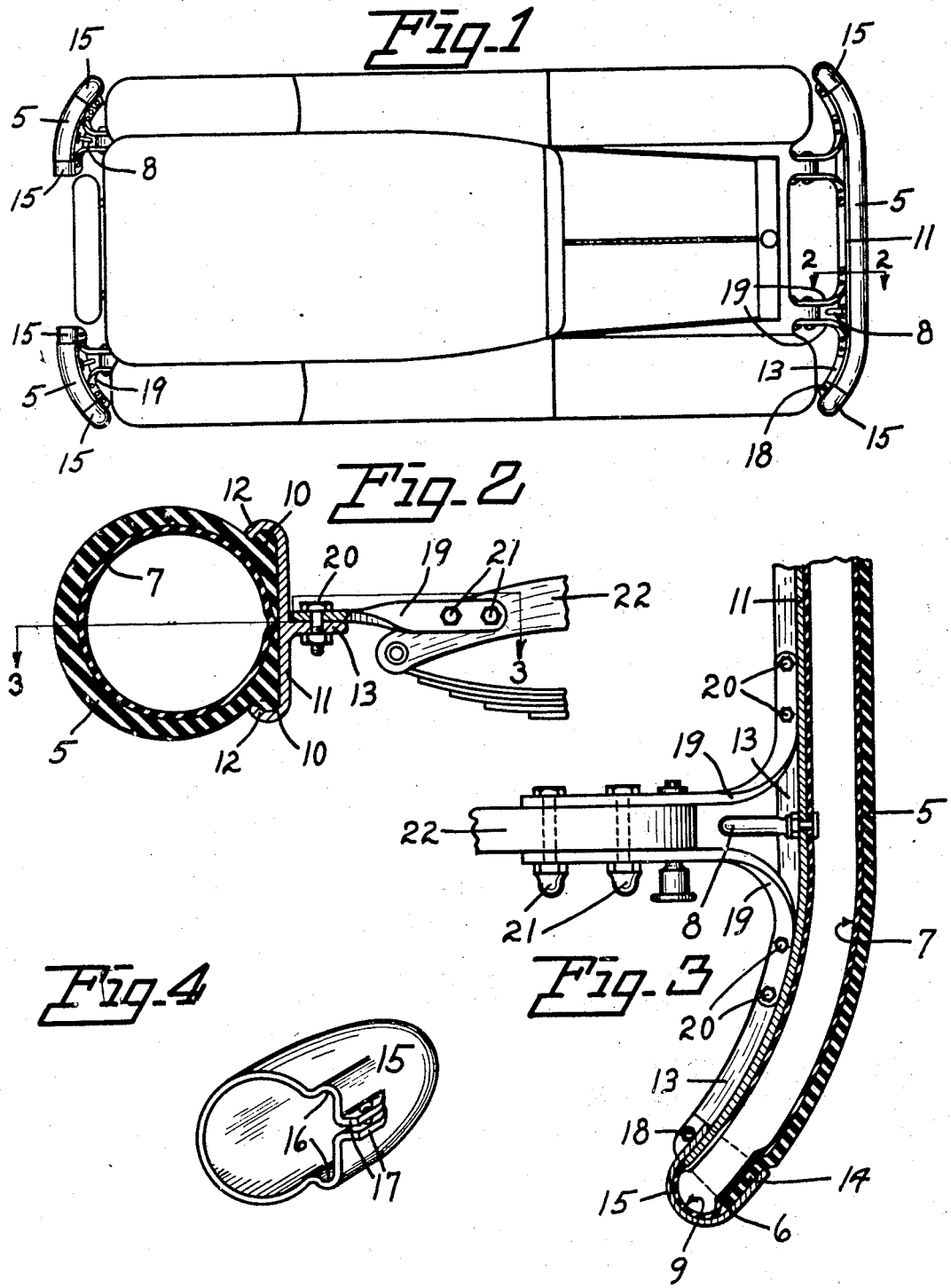

1,780,908

UNITED STATES PATENT OFFICE

HERBERT M. CLAUSEN, OF SPOKANE, WASHINGTON

PNEUMATIC BUMPER

Application filed October 14, 1929. Serial No. 399,460.

My invention relates to pneumatic bumpers that are particularly adapted for use on motor vehicles and certain objects of the invention are to provide a flexible pneumatic bumper comprising an inner inflatable tube housed within an outer resilient casing having open ends whereby the inner-tube may be installed or removed without disturbing the outer casing. Other objects are to provide a clincher frame member for clamping the flanges of the outer casing similar to the rim of an automobile wheel together with detachable metal end caps secured to said clincher frame that serve as a closure for the ends of the outer casing and as a protection for the ends of the inner-tube. Further objects are to provide spring bracket supports, fixed to a stiffener rib of the clincher frame and to a fixed part of the vehicle, that serve as means for absorbing violent shocks.

With the above and other objects in view which will appear as the description proceeds, the invention consists of the novel construction, adaptation, combination and arrangement of parts hereinafter described and claimed. These objects are accomplished by devices illustrated in the accompanying drawings; wherein:—

Figure 1 is a top plan view of an automobile equipped with both front and rear bumpers constructed in accordance with my invention;

Fig. 2 is a view in transverse vertical section taken substantially on a broken line 2, 2 of Fig. 1;

Fig. 3 is a view in horizontal section taken substantially on a broken line 3, 3 of Fig. 2; and Fig. 4 is a view in perspective of one of the end caps.

Referring to the drawings throughout in which like reference numerals designate like parts, the numeral 5 indicates the outer rubber bumper casing that is open at both ends, as at 6 in Fig. 3, and is somewhat similar in cross section to an ordinary automobile tire. The numeral 7 designates the inner-tube that is also made of rubber and is somewhat similar to the inner-tube of an automobile tire. Said inner-tube is inflated through a valve 8 in the regular manner. When the inner-tube is installed and positioned within the outer casing both of its ends project exteriorly of said outer casing as shown at 9 in Fig. 3.

The outer casing 5 is provided with longitudinal clincher or flange portions 10 and a clincher frame member 11, made of a single piece of metal, is provided with curved or hooked edge portions 12 that fit over the said clincher portions of the outer casing and hold said casing securely in place. Said clincher frame member is centrally provided on its rear side with an integral stiffener rib 13 which in addition to serving as a reenforcement for said clincher frame also provides means of support for certain other members as presently set forth.

The outer ends of the bumper casing 5 are reduced, as shown at 14 in Fig. 3, and metal caps 15, as shown in detail in Fig. 4, are adapted to fit snugly over said reduced ends. Said caps are shaped at 16 to conform with and slip over the ends of the clincher frame 11 and are slotted and provided with lugs 17 on their rear sides having holes to receive bolts 18 by means of which they are secured to the ends of the clincher frame rib 13 as clearly shown in the drawings. Said metal caps thus serve as closures for the ends of the outer casing, as a protection for the ends of the inner-tube and as direct supports for the ends of said outer casing and inner-tube as will be understood.

Each end portion of the bumper is provided with a pair of oppositely curved spring supports 19 that are secured by bolts 20 to the stiffener rib 13 of the clincher frame 11. Besides being curved said spring supports are given a half twist and their inner ends may be secured by bolts 21 to the sides of a spring hanger 22 or to any other suitable part of a vehicle. Only one pair of said spring supports is ordinarily used for the short rear bumpers as shown in Fig. 1. The valve 8 is positioned between said spring supports which serve as a protection for the valve.

It will now be apparent that I have provided a durable and substantial pneumatic bumper that may be manufactured at comparatively small cost and which comprises novel means for removing the inner-tube, novel closure and supporting means for its ends, novel spring bracket supports that serve as shock absorbers and other novel details of construction. Having thus described my invention, it being understood that minor changes may be resorted to in its construction without departing from its scope and spirit, what I claim and desire to secure by Letters Patent of the United States is:—

A pneumatic bumper comprising an outer resilient casing open at both ends, an inner-tube installed within said casing and having its ends projecting exteriorly thereof, a clincher frame member, a stiffener rib for said frame, metal caps for the ends of said inner-tube and casing secured to said stiffener rib, oppositely curved and twisted spring supports secured to the stiffener rib, and a valve for the inner-tube interposed between said spring supports.

In testimony whereof I affix my signature.

HERBERT M. CLAUSEN.